No. 764,881. Patented July 12, 1904.

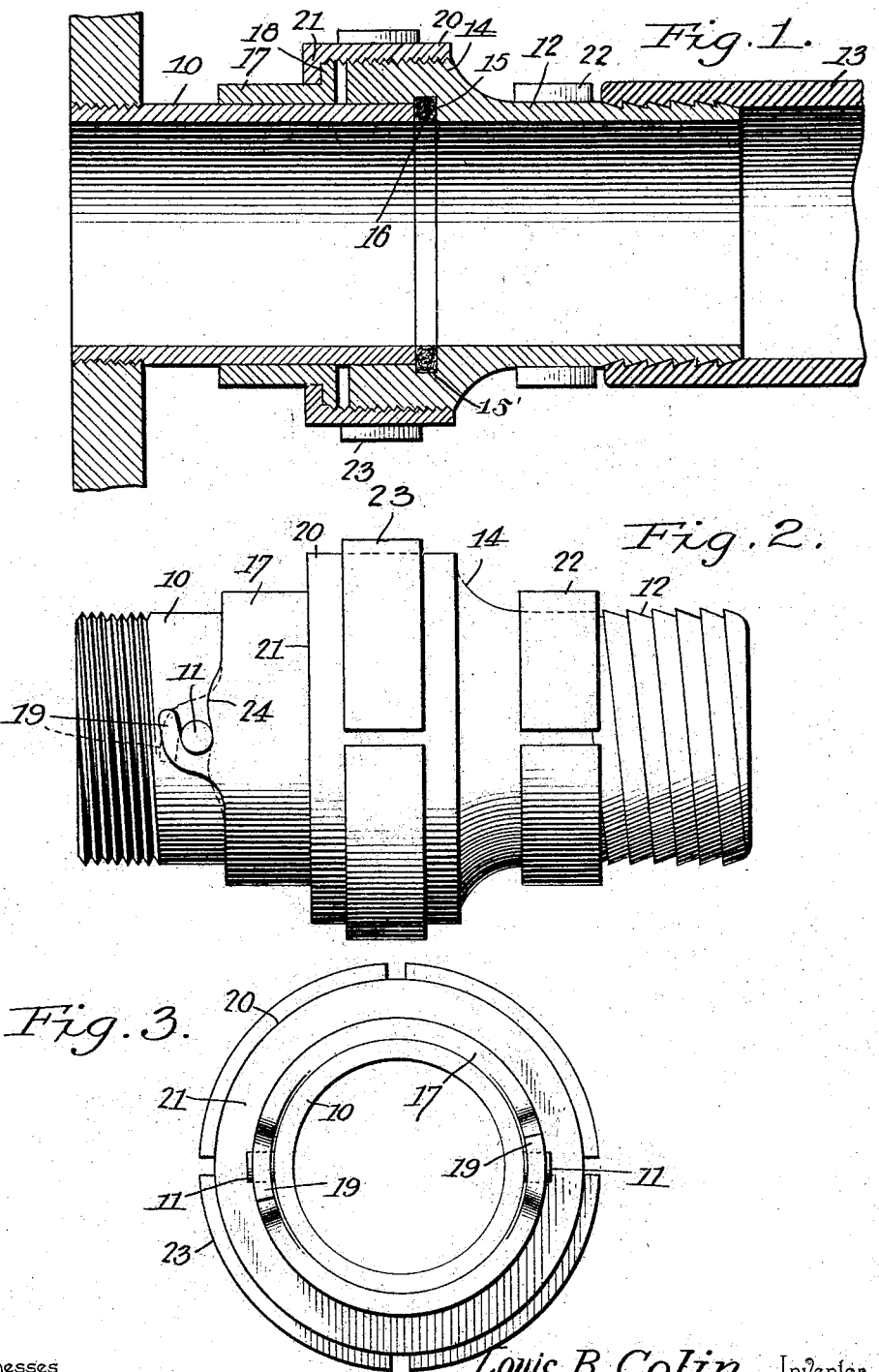

UNITED STATES PATENT OFFICE.

LOUIS B. COLIN, OF JOHNSTOWN, NEW YORK.

HOSE-COUPLING.

SPECIFICATION forming part of Letters Patent No. 764,881, dated July 12, 1904.

Application filed August 7, 1903. Serial No. 168,639. (No model.)

*To all whom it may concern:*

Be it known that I, LOUIS B. COLIN, a citizen of the United States, residing at Johnstown, in the county of Fulton and State of New York, have invented a new and useful Hose-Coupling, of which the following is a specification.

This invention relates to hose-couplings, more particularly to fire-hose couplings, and has for its object to simplify and improve devices of this character and produce a device whereby two hose-sections may be quickly and effectually coupled or a hose-section coupled to a hydrant or other source of supply; and the invention consists in certain novel features of construction, as hereinafter shown and described, and specified in the claims.

In the drawings illustrative of the invention, in which corresponding parts are denoted by like designating characters, Figure 1 is a longitudinal sectional elevation, and Fig. 2 is a side view of the same. Fig. 3 is an end elevation of the device as shown in Fig. 2.

The improved device may be employed for coupling two hose-sections or for coupling a hose-section to a hydrant fire-plug, stand-pipe, or the like, and for the purpose of illustration the device is shown arranged for coupling a hose-section to a hydrant or fire-plug, 10 representing the hydrant connection, which for convenience of reference is denoted the "primary" coupling member. This member 10 is formed with parallel side walls and without flanges or other projections at its free end, but is provided with spaced lateral studs 11 near its other end, as shown. Two of the studs 11 will generally be sufficient; but a greater number may be employed, if required.

The other coupling member is represented at 12 and for the purpose of this description is denoted the "secondary" member. The hose represented at 13 is connected to the member 12 in the ordinary manner, as shown. The free end of the member 12 is somewhat enlarged, as at 14, and adapted to fit over the free end of the member 10, the shoulder 15 resulting from this enlargement forming a rest against which a packing-ring 16 is supported and against which the outer end of the member 10 abuts, as shown in Fig. 1. The portion 14 is externally threaded, as shown.

Loosely engaging the outer surface of the member 10 is a sleeve 17, having a flange 18 on its outer end corresponding to and in longitudinal alinement with the adjacent end of the portion 14 of the member 12. The sleeve 17 is provided with hooks 19, adapted to engage the studs 11 when the sleeve is rotated in one direction and be released therefrom when turned in the opposite direction. Surrounding the portion 14 is a clamp-collar 20, internally threaded to engage the threaded portion 14 and having an internal flange 21 engaging the flange 18 of the sleeve 17, as shown.

In operating the device the collar 20 is loosened by rotating it backwardly and the portion 14 of the member 12 placed over the outer free end of the member 10 with the hooks 19 out of engagement with the studs 11. The sleeve 17 is then rotated to cause the hooks to engage the studs. The collar 20 is then rotated to draw the member 12 longitudinally of the member 10 and cause the shoulder 15 to compress the packing 16 against the member 10, and thus "pack" the joint. A shallow annular recess 15' is formed in the member 12 for the reception of the packing-ring 16, as shown, so that it will not fall out when the parts are disconnected.

It will be noted that the coupling is complete when the hooks 19 are engaged with the studs to an extent sufficient to prevent displacement of the parts, and by forming the approach to the hooks inclined, as at 24, the act of closing the hooks upon the studs will draw the member 12 14 longitudinally of the member 10 and compress the packing 16. This may be a sufficient packing means for some purposes where the hose is subjected to a low pressure; but when the hose is to be subjected to a high pressure the clamp-collar 20 will be employed to complete the coupling. The members 12 and 20 will be provided, respectively, with wrench-flanges 22 23 to enable them to be efficiently operated by the ordinary hose or "spanner" wrenches. This makes a very simple and efficient hose-coupling, which may be very quickly connected and disconnected and rendered operative in the minimum of time.

When "coupling up" for a fire, it is only necessary to pass the portions 14 17 over the member 10 and rotate the member 17 a short distance to couple the hooks 19 to the studs 11.

The water can then be immediately "turned on," as the joint will be relatively tight and can be so constructed that it will not leak under low pressure and very slightly under high pressure. Then to complete the couplings and prevent all leakage the collars 20 may be tightened up at the leisure of the operator.

It frequently happens that the saving of even a very short time in coupling up and placing the hose in position to receive the water at fires is very important, and the device herein described provides this very desirable rapid coupling means, as above noted, when required. By this simple means a line of hose may be very quickly "laid" and operatively coupled with the minimum of time and labor.

It will be noted that, the portion 14 of the part 12 closely engaging the part 10 and firmly held in place thereon by the sleeve 21 or collar 20, all transverse strains are effectually resisted, so that no lateral movements or wrenchings to which the hose may be subjected will loosen the couplings or cause them to leak. All lateral strains are thus borne between the relatively solid or immovable portions 10 and 14 and are not communicated to the other parts except indirectly and which by their peculiar form and arrangement enable them effectually to resist. By this simple means a coupling is produced which is very rigid and strong without material increase of material or weight, as the material and weight are so uniformly distributed as to offer a uniform resistance throughout the whole structure and effectually preventing any warping or twisting of the parts and the loosening of the joints under strains.

The parts, except the packing and hose, will be of metal of suitable strength and size to enable them to withstand the strains to which they will be subjected, and the device may be constructed to adapt it to any of the various sizes and construction of hose.

It will be noted by reference to Fig. 2 that the inclined approaches 24 to the hook members 19 form projections which offer a slight resistance to the release of the studs 11 when the coupling is to be released, and thus prevent the too easy or accidental uncoupling.

Having thus described the invention, what I claim is—

1. In a hose-coupling, a primary coupling member having parallel side walls and lateral studs, a secondary coupling member externally threaded and having an internal shoulder and fitting over said primary member, a packing between said shoulder and the free end of said primary member, a sleeve movably engaging said primary member and having a flange upon its inner end, said sleeve having hooks for engaging said lateral studs, and an internally-threaded collar engaging said threaded secondary coupling member and having an internal flange engaging the flange upon said sleeve, substantially as described.

2. A hydrant-coupling for fire-hose comprising a hose-engaging tubular member having one end formed for connection with a hose and its opposite end externally screw-threaded, a rotatable internally-screw-threaded adjusting-collar embracing the screw-threaded portion of the tubular member and adjustable longitudinally thereon by means of its screw-threaded connection therewith, and a hydrant-engaging sleeve provided at its outer end with bayonet-slots and having its rear end registered with the front end of the adjusting-collar and swiveled thereto, whereby the sleeve may move back and forth in a straight line with the collar without turning therewith and is also capable of being rotated independently of the collar to engage and disengage the sleeve with respect to a hydrant.

3. The combination with the nipple of a hydrant provided with outwardly-directed lateral lugs, of a hose having an externally-screw-threaded tubular coupling member thereon, a rotatable internally-screw-threaded adjusting-collar fitted to the screw-threaded portion of the tubular coupling member and adjustable thereon by means of the screw-threaded connection, and a sleeve embracing and swiveled upon the outer end of the collar to move back and forth in a straight line therewith without turning with the collar and having its outer end provided with bayonet-slots for the detachable reception of the lugs of the nipple, and said sleeve also capable of being rotated upon its swiveled connection independently of the rotatable movement of the collar to engage and disengage the sleeve with respect to the lugs.

In testimony that I claim the foregoing as my own I have hereto affixed my signature in the presence of two witnesses.

LOUIS B. COLIN.

Witnesses:
CHAS. A. McMARTIN,
WILLIAM M. COLIN.